(12) United States Patent
Thiel

(10) Patent No.: US 8,485,599 B2
(45) Date of Patent: Jul. 16, 2013

(54) ARRANGEMENT FOR A VEHICLE SEAT

(75) Inventor: Peter Thiel, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 314 days.

(21) Appl. No.: 12/865,153

(22) PCT Filed: Aug. 1, 2009

(86) PCT No.: PCT/EP2009/005592
§ 371 (c)(1),
(2), (4) Date: Jul. 29, 2010

(87) PCT Pub. No.: WO2010/020340
PCT Pub. Date: Feb. 25, 2010

(65) Prior Publication Data
US 2010/0320823 A1 Dec. 23, 2010

(30) Foreign Application Priority Data
Aug. 18, 2008 (DE) .......................... 10 2008 038 581

(51) Int. Cl.
B60N 2/42 (2006.01)
B60N 2/02 (2006.01)

(52) U.S. Cl.
USPC .................. 297/216.13; 297/361.1; 297/362

(58) Field of Classification Search
USPC .................. 297/216.13, 354.12, 361.1, 362, 297/366, 367 R, 367 P; 29/DIG. 48; 228/126–134, 244–262
See application file for complete search history.

(56) References Cited

U.S. PATENT DOCUMENTS

| 4,223,947 | A | 9/1980 | Cremer |
| 5,634,689 | A | 6/1997 | Putsch et al. |
| 6,010,191 | A * | 1/2000 | Calinaud et al. ........... 297/367 R |
| 6,770,840 | B2 * | 8/2004 | Minamida et al. ........ 219/121.64 |
| 6,799,806 | B2 | 10/2004 | Eppert et al. |
| 2003/0178878 | A1 * | 9/2003 | Hoshihara et al. .......... 297/361.1 |
| 2007/0035168 | A1 * | 2/2007 | Assmann ....................... 297/353 |
| 2007/0170764 | A1 * | 7/2007 | Thiel et al. .................... 297/367 |
| 2007/0241602 | A1 * | 10/2007 | Thiel et al. .................... 297/369 |
| 2010/0052393 | A1 * | 3/2010 | Mitsuhashi et al. ....... 297/367 R |
| 2010/0060063 | A1 * | 3/2010 | Hille .......................... 297/354.1 |
| 2010/0171351 | A1 * | 7/2010 | Thiel et al. .................... 297/341 |

FOREIGN PATENT DOCUMENTS

| DE | 44 36 101 A1 | 6/1995 |
| DE | 44 39 644 A1 | 6/1995 |
| DE | 101 05 282 B4 | 8/2002 |
| DE | 101 20 854 | 8/2002 |
| DE | 102 06 303 A1 | 8/2003 |
| DE | 10 2004 018744 | 9/2005 |
| FR | 2 900 605 | 11/2007 |
| WO | WO 02/062614 A1 | 8/2002 |

* cited by examiner

Primary Examiner — David Dunn
Assistant Examiner — Philip Gabler
(74) Attorney, Agent, or Firm — McGlew and Tuttle, P.C.

(57) ABSTRACT

An arrangement for a vehicle seat includes an inner element (11c, 11d), an outer element (9, 16a), which has an opening (16b) having an edge (9c, 16c) and receives the inner element (11c, 11d), and a weld seam (20) which connects the outer element (9, 16a) to the inner element (11c, 11d). The edge (16c) of the opening of the outer element (9, 16a) is interspaced from the inner element (11c, 11d) over the largest part of its circumference and defines a radial gap (G) having a defined maximum width, the weld seam (20) being introduced into the gap (G).

8 Claims, 3 Drawing Sheets

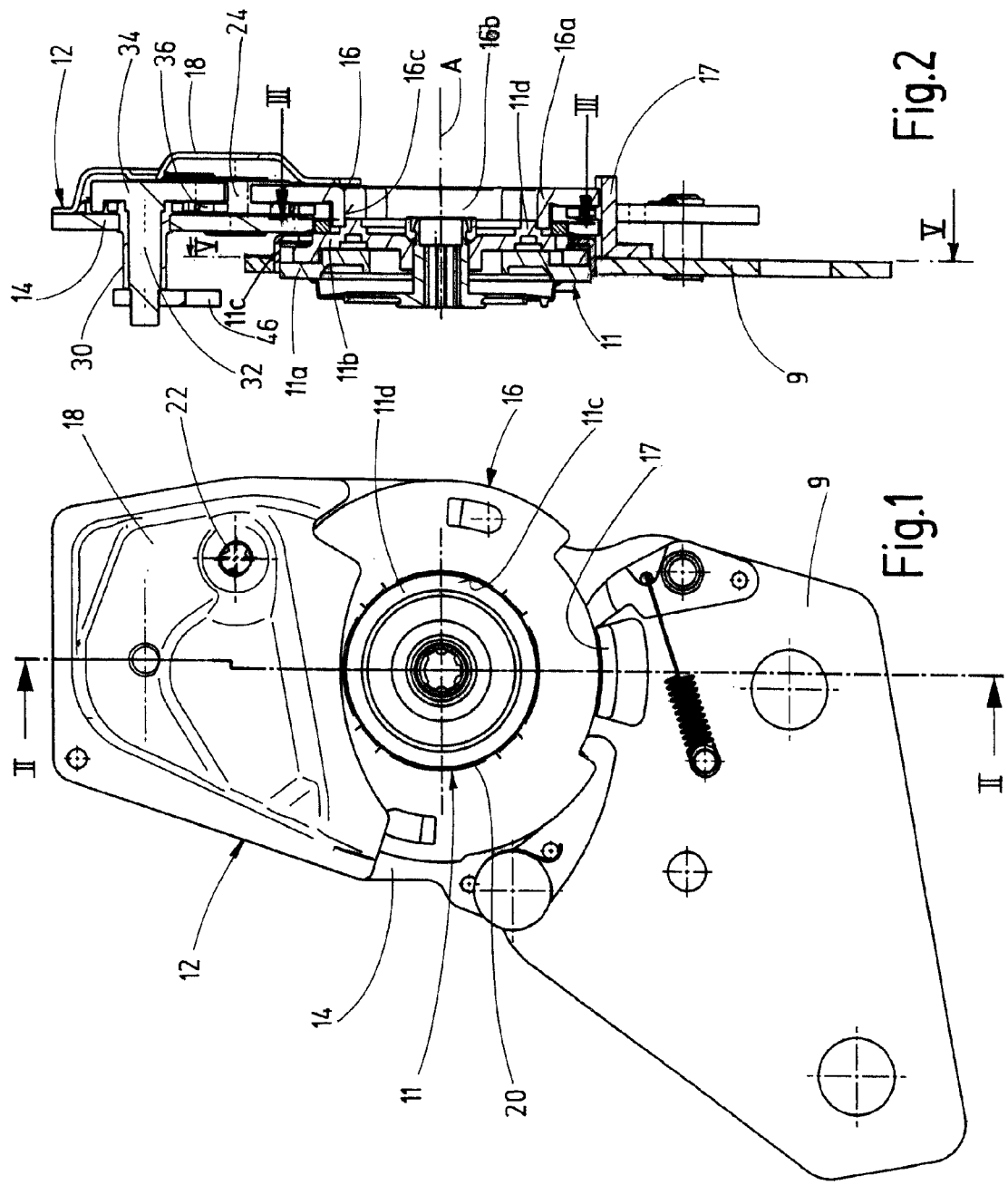

ARRANGEMENT FOR A VEHICLE SEAT

CROSS REFERENCE TO RELATED APPLICATIONS

This application is a United States National Phase application of International Application PCT/EP2009/005592 and claims the benefit of priority under 35 U.S.C. §119 of German Patent Application de 10 2008 038 581.6 filed Aug. 18, 2008, the entire contents of which are incorporated herein by reference.

FIELD OF THE INVENTION

The invention relates to an arrangement for a vehicle seat, with the arrangement comprising an inner element and an outer element which has an opening provided with an edge and with the opening receiving the inner element.

BACKGROUND OF THE INVENTION

An arrangement of this type configured as a fitting for a two-door motor vehicle is disclosed in DE 102 06 303 A1, said fitting being used to permit access to the rear by freely pivoting the backrest forward, and to provide different inclination settings of the backrest for use by an occupant. The first fitting part of an adjustment fitting is connected to the seat part of the vehicle seat, whilst a free-pivoting unit comprising a third fitting part and connected to the backrest is welded to the second fitting part of the adjustment fitting. To this end, a bearing ring which bears the third fitting part is pressed onto an annular projection of the second fitting part. A double flange ring which forms an outer element has a central opening provided with an edge, said opening receiving the bearing ring which forms an inner element. Two short weld seams connect the double flange ring to the bearing ring. For laser welding with filler material, a gap could be present for inserting the weld filler material.

SUMMARY OF THE INVENTION

The object of the invention is to improve an arrangement of the type described in the introduction for laser welding with filler material. This object is achieved according to the invention by an arrangement for a vehicle seat comprising an inner element, an outer element which has an opening provided with an edge. The opening receives the inner element and a weld seam connects the outer element to the inner element. The edge of the opening of the outer element is spaced apart from the inner element over the largest part of its periphery, forming a radial gap with a defined minimum width. The weld seam is introduced into the gap, in particular by using a filler material. At least one, preferably four bearing points are provided for forming the gap. The bearing points protrude radially from the edge of the opening of the outer element or from the inner element.

As the edge of the opening of the outer element is spaced apart from the inner element over the largest part of its periphery, forming a defined radial gap, and a weld seam is introduced into the gap, the outer element is connected to the inner element with low distortion. Bearing points permit the formation of the gap at a width which remains approximately constant, which does not fall below the minimum width and is also maintained after the welding process, if the gap is filled with a filler material which is fused and solidifies again. If the width of the gap is slightly greater than the minimum width, which is preferably the case, a floating bearing of the outer element on the inner element results (or vice versa). In a preferred embodiment of the connecting point between the outer element and inner element, through a slightly larger opening of the outer element, for example in a collar (which may bear further components, for example on its outer face) and a slightly smaller inner element, for example an annular bead, the bearing points protrude in a radial manner. In this case, the bearing points may be formed on the outer element or on the inner element. An integral, i.e. molded-on, configuration is preferred. The dimensions of the bearing points, in particular in the radial and axial directions, are preferably quite small in comparison, for example, with the diameter of the opening and are designed for an optimal gap width and thus an optimal weld seam. At least three, preferably four, bearing points which are uniformly distributed over the periphery of the edge of the opening, produce a sufficiently defined relative positioning of the outer element and the inner element.

The arrangement according to the invention may, for example, be a fitting between the seat part and the backrest of a vehicle seat. The outer elements or inner elements may thus be fitting parts, adapters or other components of the fitting including flanges, collars or projections formed thereon Annular or circular disk-shaped elements are preferred, when an accurate relative position is not required.

The invention is preferably able to be used in longitudinally adjustable vehicle seats of two-door motor vehicles with more complex fittings, with inclination adjustment and central free-pivoting of the backrest, but may also be used for other vehicle seats. When using the fitting according to the invention for activating the so-called "easy entry function", in which in addition to the free-pivoting of the backrest the vehicle seat is moved, the pivoting back of the backrest may be carried out specifically when the previously adjusted longitudinal seat position is reached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of the exemplary embodiment according to the invention;

FIG. 2 is a sectional view through the exemplary embodiment along the line II-II in FIG. 1;

DESCRIPTION OF THE PREFERRED EMBODIMENTS

Figure 3:
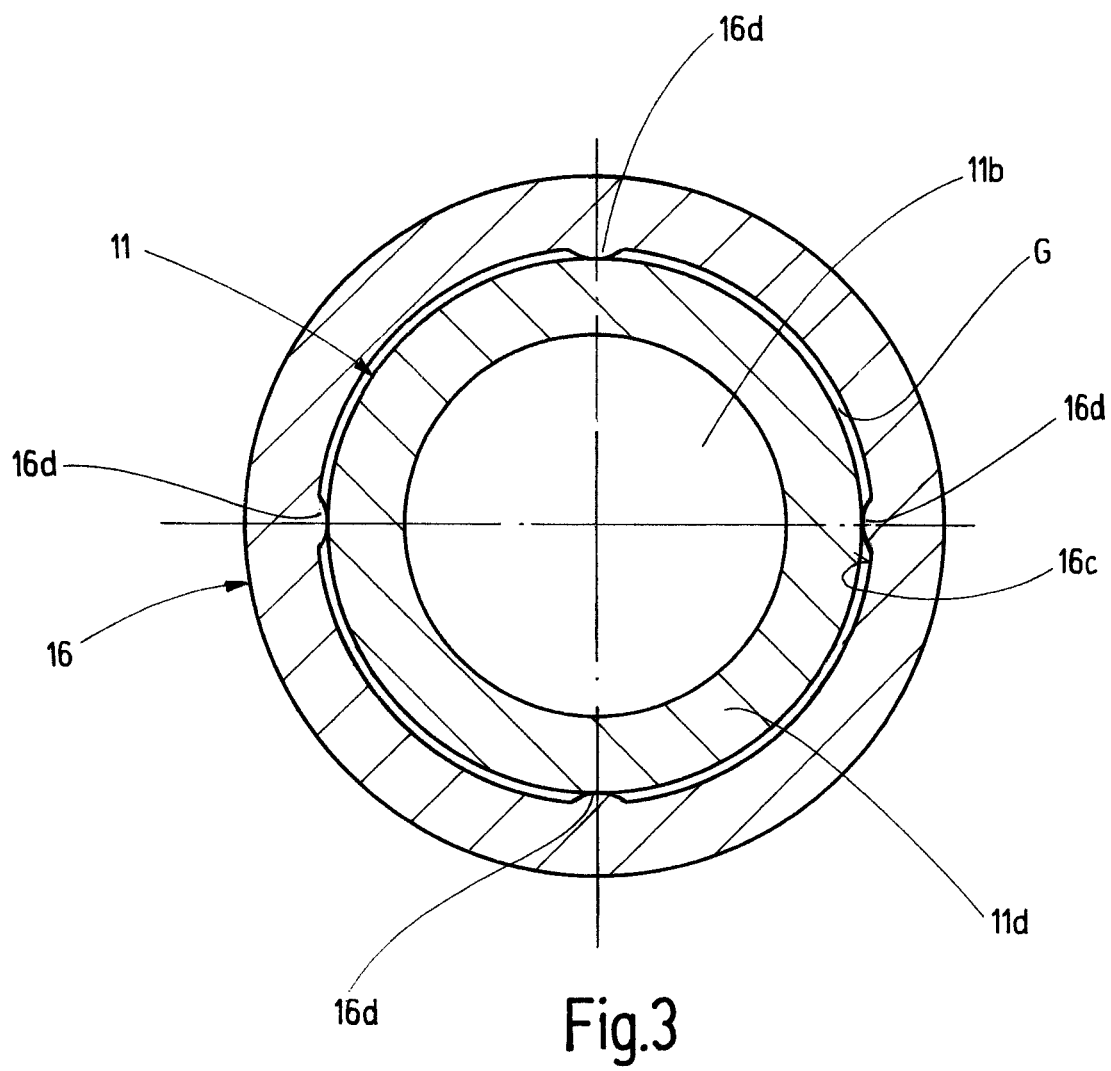
FIG. 3 is a sectional view through a part of the exemplary embodiment along the line III-III in FIG. 2.
Figure 4:
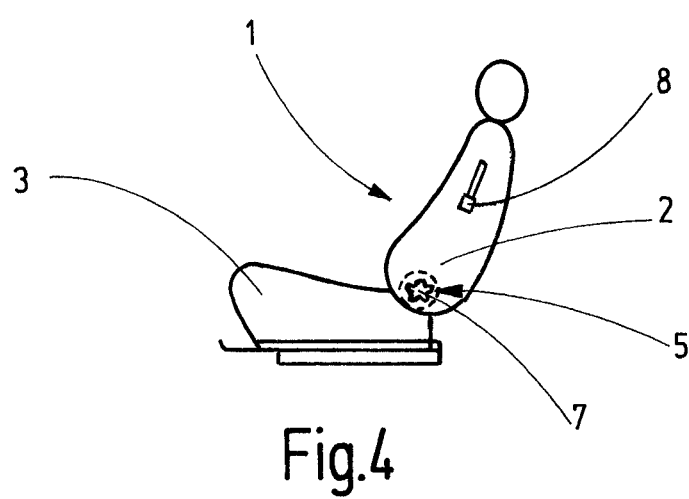
FIG. 4 is a schematic side view of a vehicle seat according to the invention.

Referring to the drawings in particular, a vehicle seat 1 for a two-door motor vehicle comprises one respective fitting 5 on both sides thereof for adjusting the inclination, i.e. slow, precise angular alteration between a plurality of positions of use, and for the free-pivoting, i.e. rapid, extensive angular alteration from a position of use into a freely-pivoted position as a specific position of non-use, of its backrest 2 relative to its seat part 3. The fitting 5 is an exemplary embodiment of the arrangement according to the invention. For the function of adjusting the inclination, on one of the fittings 5 a hand wheel 7 is provided on the outside of the vehicle seat 1 and a shaft connected to the hand wheel 7 is provided between both fittings 5, whilst for the free-pivoting function a free-pivoting operating element 8, for example a hand lever, is movably attached to the backrest 2.

The fittings 5 are in each case able to be fastened by means of an adapter 9 to the structure of the seat part 3 ("fixed to the seat part"). Each fitting 5 comprises a backrest inclination adjustment fitting, denoted in short hereinafter as an adjustment fitting 11, with two fitting parts 11a and 11b which may be rotated relative to one another, and a free-pivoting unit 12 which in turn has a third fitting part 14, which is used for fastening the fitting 5 to the structure of the backrest 2 ("fixed to the backrest").

The adjustment fitting 11 is configured in terms of construction as a disk-shaped unit, as is disclosed for example in DE 101 05 282 B4, the disclosure thereof being expressly included in the invention (and corresponding U.S. Pat. No. 6,799,806 is incorporated herein by reference in its entirety). The first fitting part 11a and the second fitting part 11b are held together in the axial direction by means of a clasping ring 11c. In the exemplary embodiment, the adjustment fitting 11 is configured as a geared fitting, i.e. the two fitting parts 11a and 11b are mechanically linked to one another by means of an eccentric epicyclic gear—which is self-locking in the present case—and which in the present case permits the securing of the two fitting parts 11a and 11b without clearance and for stepless adjustment forces a relative rotation of the two fitting parts 11a and 11b with a superimposed wobble motion. Such a geared fitting is, for example, disclosed in DE 44 36 101 A1, the disclosure thereof being expressly included in the invention (and corresponding U.S. Pat. No. 5,634,689 is incorporated herein by reference in its entirety). The rotation of the hand wheel 7 drives the geared fitting. However, other geared fittings and—in theory—also latching fittings may also be used as an adjustment fitting 11. In the latter case, a small rotation of the hand wheel 7, or a lever provided as an alternative, unlocks the latching fitting. The adjustment fitting 11 is fixedly connected with the first fitting part 11a and the clasping ring 11c to the adapter 9, i.e. the first fitting part 11a is fixed to the seat part. To this end, the adapter 9 has an annular (or fork-shaped) receiver for the adjustment fitting 11.

The free-pivoting unit 12 has an—approximately annular—latching element 16, relative to which the third fitting part 14 is rotatably mounted about an axis A. The axis A and its position within the vehicle seat 1 define the directional information used in the present case. As the axis A—possibly excluding the wobble motion—coincides with the central axis of the adjustment fitting 11, central free-pivoting is present in this case. A stop 17 is fastened to the adapter 9 and axially protrudes therefrom. The latching element 16 has on one part of its periphery a recess which is offset radially to the inside and defined in each case by a step, and within which the stop 17 is arranged. By the cooperation of the stop 17 with the steps of the latching element 16, the angle for adjusting the inclination of the backrest 2 is defined.

For mounting the third fitting part 14, the latching element 16 in the present case has a collar 16a protruding axially relative to the axis A, on which the third fitting part 14 is rotatably mounted. The third fitting part 14 also has a collar which protrudes toward the latching element 16, so that the latching element 16 and the third fitting part 14 are spaced apart from one another. The third fitting part 14 is arranged axially between the latching element 16 and the adjustment fitting 11, so that on the side remote from the adjustment fitting 11 it is axially secured by means of the latching element 16. A retaining washer may be provided for axially securing the third fitting part 14 on the side facing the adjustment fitting 11, in particular before mounting the free-pivoting unit 12, and for forming a pre-assembled sub-assembly, said retaining washer being connected to the latching element 16 after positioning the third fitting part 14 on the collar 16a of the latching element 16, and said retaining washer engaging behind the third fitting part 14. A cover 18 connected to the third fitting part 14 defines, on the one hand, a constructional space between itself and the third fitting part 14 protruding at the top over the latching plate 16. On the other hand, the lower edge of the cover 18 is configured as a retaining clip and engages over the latching element 16, optionally by the interposition of a slide, for example made of plastic material. The cover 18 thus serves as further axial securing of the third fitting part 14.

The latching element 16 (and thus the free-pivoting unit 12) is connected fixedly to the second fitting part 11b in a manner according to the invention. To this end, the latching element 16 has in its collar 16a a central opening 16b by means of which it is pushed onto a projection 11d of the second fitting part 11b, as shown in FIG. 3. The collar 16a thus defines an outer element, and the projection 11d defines an inner element. The internal diameter of the outer element (preferably approximately 50 mm) is slightly greater than the external diameter of the inner element, so that a radial gap G is formed therebetween, the radial width thereof, for example, being less than 1 mm, preferably between 0.2 mm and 0.6 mm. On the edge 16c of the central opening 16b, i.e. on the outer element, four bearing points 16d are formed, preferably molded-on, said bearing points being arranged offset in each case by 90° relative to one another in the peripheral direction about the axis A and projecting radially inward. One or more bearing points 16d bear directly against the inner element, so that the gap G maintains a defined, constant minimum width. In the present case, the radial dimension of the bearing points 16d is dimensioned so that the width of the gap G is slightly greater than the minimum width is able to be, so that a floating bearing of the outer element on the inner element (or vice versa) results. The dimension of the bearing points 16d in the peripheral direction is preferably approximately 5 mm. The edge 16c is thus spaced apart from the inner element over the greatest part of its periphery. The axial dimension of the bearing points 16d preferably corresponds to the axial dimension of the gap G, so that the bearing points 16d are bead-shaped formations extending in the peripheral direction. The axial dimension of the bearing points 16d may also be greater than the axial dimension of the gap G, so that arch-shaped formations are present instead.

When connecting the free-pivoting unit 12 to the adjustment fitting 11, a wire made of a filler material is inserted into the gap G, said wire then being fused by a laser beam, so that a weld seam 20 which is formed is introduced into the gap G. The combination of laser welding and the gap G, the width thereof maintaining a defined minimum width by means of the bearing points 16d, produces a secure connection which is free of cracks and has low distortion between the outer element and the inner element, i.e. in the present case between the free-pivoting unit 12 and the adjustment fitting 11.

Figure 5:
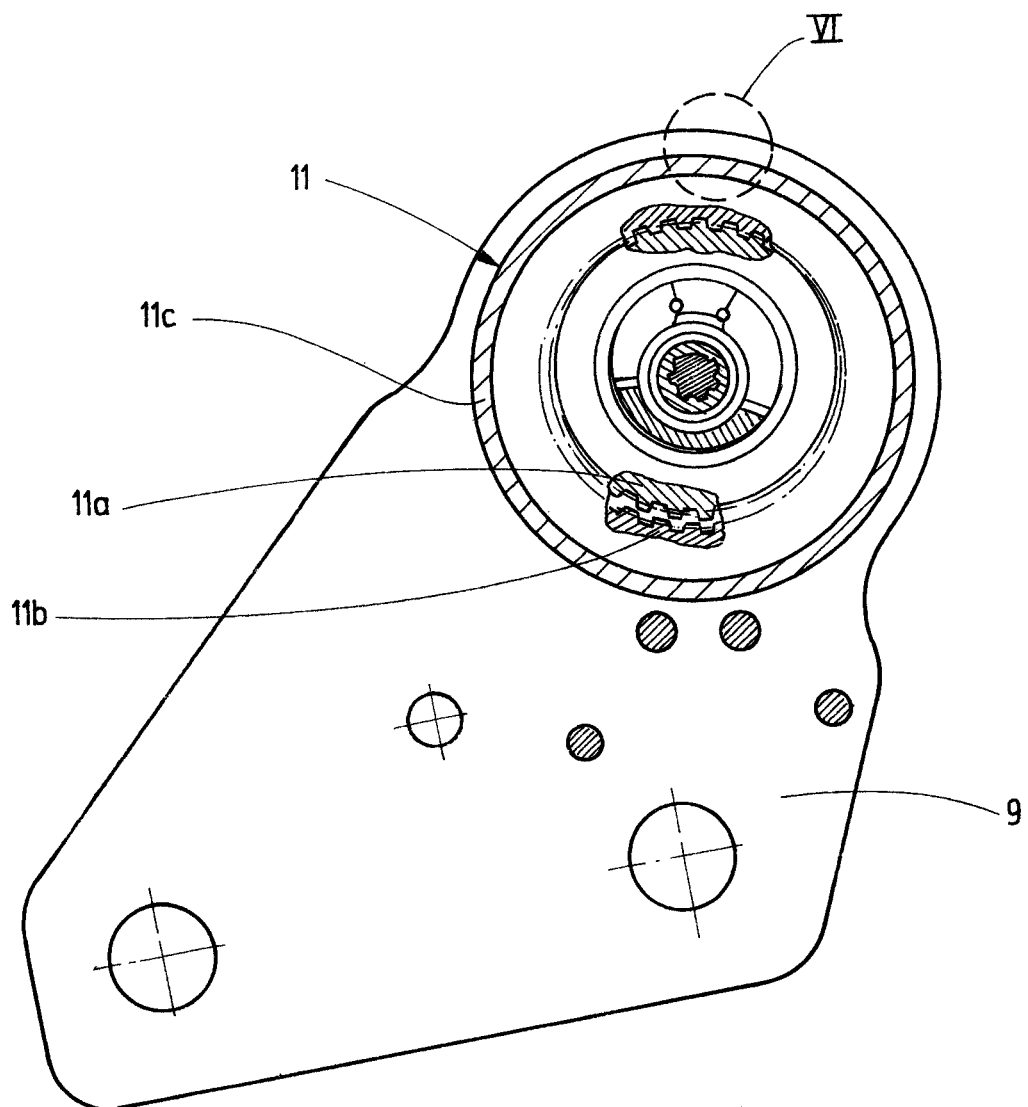
FIG. 5 is a sectional view along the line V-V in FIG. 2.
Figure 6:
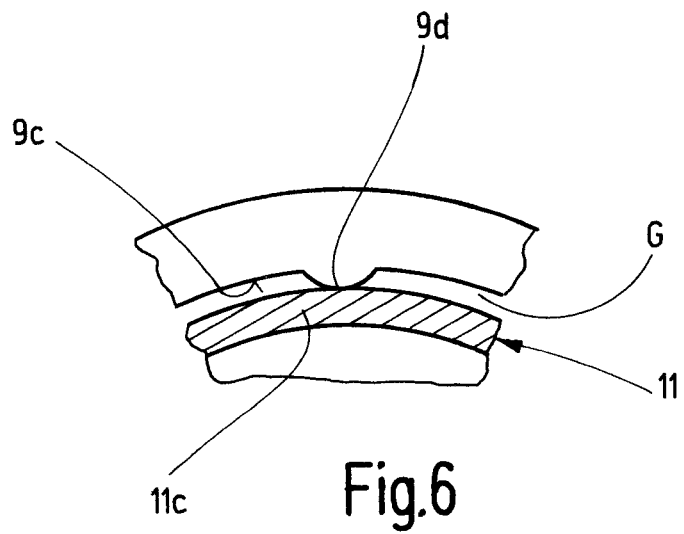
FIG. 6 is an enlarged view of the detail VI in FIG. 5.

In the same manner shown in FIGS. 5 and 6 according to the invention the adapter 9 is fixedly connected to the clasping ring 11c (or alternatively the first fitting part 11a). The adapter 9 has an opening, by means of which it receives the clasping ring 11c. The adapter 9 defines the outer element, therefore, and the clasping ring 11*c* defines the inner element. The dimensions and dimensional ratios approximately correspond to the aforementioned information. The internal diameter of the outer element (preferably approximately 50 mm) is slightly greater than the external diameter of the inner element, so that a radial gap G is formed therebetween, the radial width thereof being less than 1 mm, for example, preferably between 0.2 mm and 0.6 mm. Four bearing points 9*d* are formed on the edge 9*c* of the opening of the adapter 9, i.e. on the outer element, preferably molded-on, and which are arranged offset relative to one another in each case by 90° in the peripheral direction relative to the center of the opening and which protrude radially inwards. One or more bearing points 9*d* bear directly against the inner element, so that the gap G maintains a defined, constant minimum width. In the present case, the radial dimension of the bearing points 9*d* is dimensioned so that the width of the gap G, at least outside the bearing region of the bearing points 9*d*, may be slightly greater than the minimum width, so that a floating bearing of the outer element on the inner element (or vice versa) results. The edge 9*c* is spaced apart from the inner element over the greatest part of its periphery.

When connecting the adapter 9 to the adjustment fitting 11, in addition to the laser beam, a wire made of a filler material is introduced into the gap G, said wire then being fused by a laser beam, so that a weld seam 20 which is formed is incorporated in the gap G. In order to prevent the fused filler material from flowing out on the side of the adapter 9 remote from the laser beam, i.e. to prevent through-welding, a circlip is preferably attached to the adjustment fitting 11 which closes the gap G on the side of the adapter 9 remote from the laser beam. The combination of laser welding and the gap G, the width thereof maintaining a defined minimum width by means of the bearing points 16*d*, produces a secure connection which is free of cracks and has low distortion between the outer element and inner element, i.e. in the present case between the adapter 9 and the adjustment fitting 11.

Different components are provided within the constructional space between the cover 18 and the third fitting part 14. On the third fitting part 14 a pawl 24 is pivotably mounted by means of a bearing pin 22, the pawl 24 being able to be locked to the latching element 16 and namely without clearance and outside the self-locking region. A bearing bush 30 is located in the third fitting part 14, preferably fixedly in terms of rotation, said bearing bush, for example, being riveted or welded into an opening of the third fitting part 14. An unlocking shaft 32 is rotatably mounted by means of said bearing bush 30 parallel to the axis A and to the bearing pin 22. A capture element 34 is located fixedly in terms of rotation on the unlocking shaft 32 or in the present case is configured integrally with the unlocking shaft 32, whilst a clamping element 36—arranged axially adjacent to the capture element 34—is pivotably mounted on the bearing bush 30. Thus the unlocking shaft 32 is mounted on the inside in the bearing bush 30 and the clamping element 36 is mounted on the outside on the bearing bush 30. The capture element 34 and the clamping element 36 are aligned with the pawl 24 when the third fitting part 14 is locked. The mode of operation of the capture element 34 and the clamping element 36 is disclosed in DE 44 39 644 A1, the disclosure thereof being expressly included in the invention (and corresponding U.S. Pat. No. 4,223,947 is incorporated herein by reference in its entirety). The clamping element 36 bears with a clamping surface which is curved eccentrically relative to the unlocking shaft 32 at an angle outside the self-locking region against a bearing surface of the pawl 24. The clamping element 36 is acted upon by a spring which is configured, for example, as a spiral spring so that the clamping element 36 bears with pretensioning against the pawl 24. As a result, the third fitting part 14 is locked without clearance to the latching element 16. The capture element 34 is, for example, acted upon by a helical tension spring which may be suspended on the third fitting part 14. The capture element 34 and the clamping element 36 are coupled together by means of a slot-pin guide so that they may be carried along with free travel. The cover 18 covers the pawl 24, the capture element 34, the clamping element 36 and the springs and protects them from soiling.

In the positions of use, in the normal case, i.e. during normal use of the seat, the pawl 24 is held (secured) by the clamping element 36 in its position and the capture element 34 is arranged at a short distance (relative to the dimensions of the pawl 24) from the pawl 24, preferably bearing against a stop of the third fitting part 14. In the event of a crash, if crash forces act on the pawl 24 and which, for example, exert a high torque on the third fitting part 14, the clamping element 36 may open due to the absence of self-locking. After a very slight pivoting motion of the pawl 24, said pawl comes to bear against the capture element 34. The capture element 34 then supports the pawl 24, which bears preferably tangentially or concentrically against the capture element 34 within the self-locking region, and in a manner which is as flat as possible. Thus the pawl 24 is prevented from being opened. Thus the locking device described above (consisting of the pawl 24, the latching element 16 as a counter element and the capture element 34 and clamping element 36 as securing elements) locks the third fitting part 14 (and thus the free-pivoting unit (12)) both in the normal case and also in the event of a crash.

On the side of the third fitting part 14 remote from the cover 20, an unlocking lever 46 is connected fixedly in terms of rotation to the unlocking shaft 32, to which a cable control operatively connected to the free-pivoting operating element 8 is fastened. Alternatively, the unlocking shaft 32 may also be actuated via an electrical actuator, for example a servomotor or the like.

The free-pivoting of the backrest 2, which is triggered by means of the free-pivoting operating element 8, starts with the unlocking of the third fitting part 14 on both vehicle seat sides. By means of the cable control (and the unlocking lever 46) the unlocking shaft 32 is rotated about its own axis. The unlocking shaft 32 drives the capture element 34 which is connected fixedly in terms of rotation thereto, and which drives the clamping element 36 by means of the slot-pin guide 44—after passing through the free travel—and thus opens said clamping element, i.e. separates and moves the clamping element 36 away from the pawl 24. The pawl 24 is thus released and may automatically open due to the absence of self-locking. In a modified embodiment, the capture element 34 may come to bear against an unlocking finger of the pawl 24 and raise said pawl with the further pivoting motion. With longitudinally adjustable vehicle seats 1, the longitudinal adjuster may be actuated simultaneously or temporally offset. By pivoting forward the backrest 2 from the position of use into the freely-pivoted position, the vehicle seat 1 may be pushed forward. If the vehicle seat 1 is in a forward longitudinal seat position and the pivoted-forward backrest 2 in the freely-pivoted position, a simplified access to the rear is possible. The freely-pivoted position of the backrest 2 may be secured by a locking pawl.

In order to return to the previously adopted position of use, the vehicle seat 1 is initially moved again to the rear, for example by pulling on the backrest 2. At the latest when the previously adopted longitudinal seat position has been reached, the backrest 2 pivots to the rear, optionally after opening the locking pawl. When reaching the previously adopted position of use, the pawl 24 again falls into the latching element 16, so that the third fitting part 14 and thus the fitting 5 are again locked.

While specific embodiments of the invention have been described in detail to illustrate the application of the principles of the invention, it will be understood that the invention may be embodied otherwise without departing from such principles.

The invention claimed is:

1. An arrangement for a vehicle seat comprising:
   an inner element;
   an outer element which has an opening provided with an edge, said opening receiving the inner element; and
   a weld seam connecting the outer element to the inner element wherein the edge of the opening of the outer element is spaced apart from the inner element over a largest part of a periphery thereof, forming a radial gap with a defined minimum width, the weld seam being introduced into the gap by using a filler material, at least one bearing point being provided for forming the gap, said bearing point protruding radially from the edge of the opening of the outer element or from the inner element, wherein the arrangement is configured as a fitting for a vehicle seat, the fitting comprising at least one adjustment fitting for adjusting the inclination of a backrest of the vehicle seat relative to a seat part of the vehicle seat, said fitting comprising a free-pivoting unit for central free-pivoting of the backrest from at least one position of use into a freely-pivoted position, the free-pivoting unit comprising a latching element which may be connected to the adjustment fitting, a third fitting part which is rotatably mounted relative to the latching element about an axis and which is connected to the backrest and a pawl which in the position of use locks the third fitting part to the latching element and in that the latching element includes a collar and forms the outer element, while the adjustment fitting forms the inner element.

2. The arrangement as claimed in claim 1 wherein the third fitting part is mounted on the collar of the latching element.

3. The arrangement as claimed in claim 1 wherein the third fitting part is axially arranged between the latching element and the adjustment fitting.

4. The arrangement as claimed in claim 3, wherein the third fitting part on the side remote from the adjustment fitting is axially secured by means of the latching element.

5. The arrangement as claimed in claim 1 wherein the free-pivoting unit has a pretensioned clamping element for securing the locked pawl in the normal case and a capture element for supporting the pawl in the event of a crash.

6. A vehicle seat comprising:
   a seat part;
   a backrest; and
   an arrangement for a vehicle seat comprising:
   an inner element with an outer surface;
   an outer element with an edge defining an opening having an inner surface, said opening receiving the inner element, one of said outer surface and said inner surface defining at least a bearing portion;
   a weld seam connecting the outer element to the inner element, the inner surface of the outer element being spaced apart from the outer surface of the inner element over a part of a periphery of the edge by said bearing portion, said bearing portion protruding radially from the edge of the opening of the outer element or from the inner element and forming a radial gap with a defined minimum width, the weld seam comprising filler material introduced into the gap, said bearing portion engaging the other one of said outer element and said inner element to define a bearing point; and
   a fitting including an adjustment fitting for adjusting the inclination of the backrest relative to the seat part, said fitting comprising a free-pivoting unit for central free-pivoting of the backrest from at least one position of use into a freely-pivoted position, said free-pivoting unit comprising a latching element for connection to the adjustment fitting, wherein a third fitting part is rotatably mounted relative to the latching element about an axis and is connected to the backrest, wherein a pawl for, in the position of use, locking the third fitting part to the latching element, said latching element including a collar and forming the outer element, said adjustment fitting being a projection on the fitting part and forming the inner element.

7. The vehicle seat as claimed in claim 6 wherein the third fitting part is mounted on the collar of the latching element.

8. The vehicle seat as claimed in claim 6 wherein the free-pivoting unit has a pretensioned clamping element for securing the locked pawl in the normal case and a capture element for supporting the pawl in the event of a crash.

* * * * *